No. 768,029. PATENTED AUG. 23, 1904.
H. M. BURDICK.
HILLER ATTACHMENT FOR CULTIVATORS.
APPLICATION FILED JUNE 1, 1903.
NO MODEL.
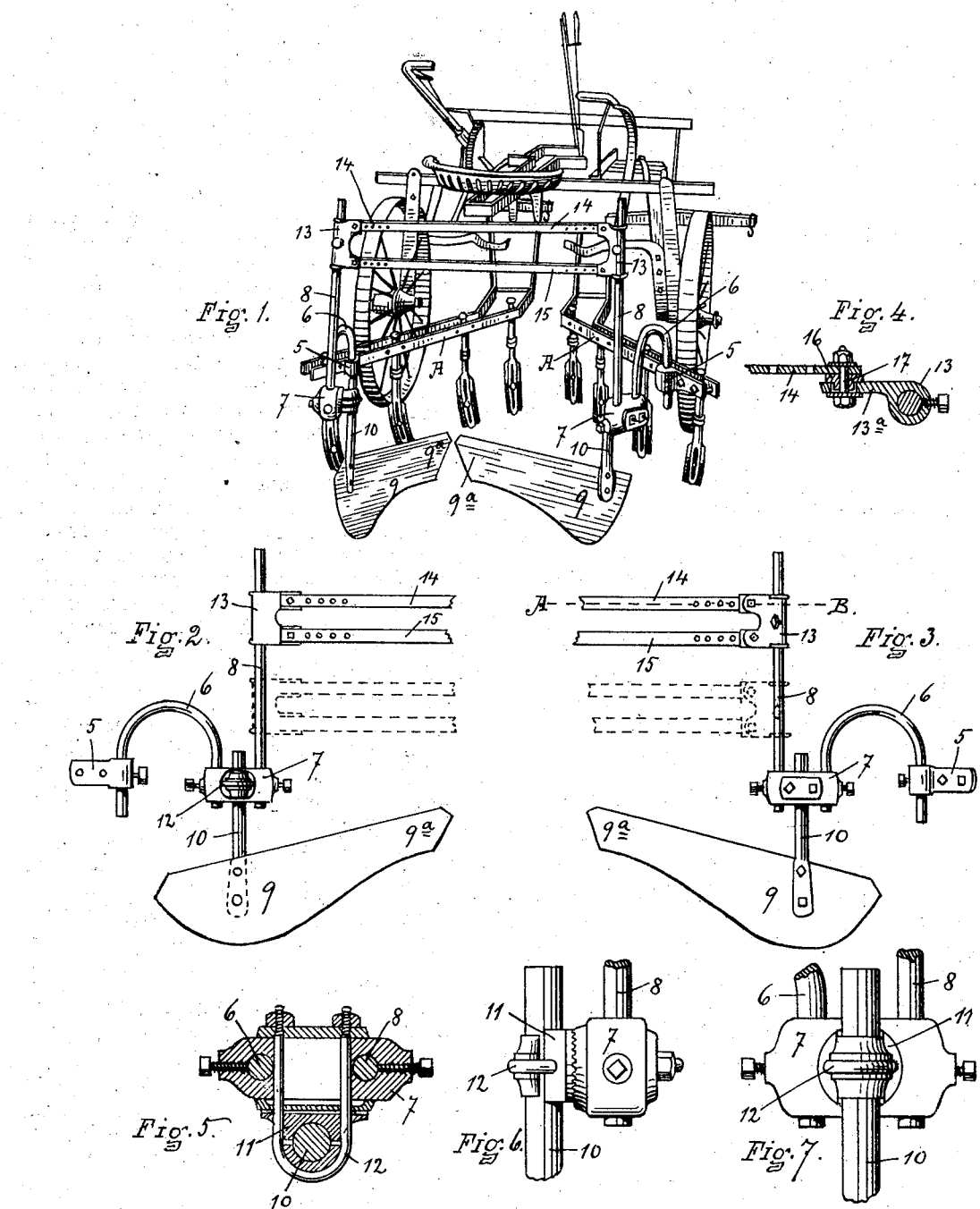
WITNESSES
Rich. A. George
E. W. Jones
INVENTOR
HIRAM M. BURDICK
By Milton E. Robinson
ATTORNEY.

No. 768,029. Patented August 23, 1904.

UNITED STATES PATENT OFFICE.

HIRAM M. BURDICK, OF UTICA, NEW YORK, ASSIGNOR TO STANDARD HARROW COMPANY, OF UTICA, NEW YORK.

HILLER ATTACHMENT FOR CULTIVATORS.

SPECIFICATION forming part of Letters Patent No. 768,029, dated August 23, 1904.

Application filed June 1, 1903. Serial No. 159,474. (No model.)

*To all whom it may concern:*

Be it known that I, HIRAM M. BURDICK, of Utica, in the county of Oneida and State of New York, have invented certain new and useful Improvements in Hiller Attachments for Cultivators; and I do hereby declare that the following is a full, clear, and exact description of the invention, which will enable others skilled in the art to which it appertains to make and use the same, reference being had to the accompanying drawings, and to the letters of reference marked thereon, which form part of this specification.

The object of my invention is to provide a hiller attachment for wheel-cultivators, which attachment is adapted to efficiently perform its work and is conveniently mounted on and removed from the machine and provided with means for all necessary adjustments and is strong and durable.

In the drawings, Figure 1 shows a perspective view from the rear of a wheel-cultivator with my improved hiller attachment applied thereto. Fig. 2 shows one of the pair of hiller attachments, as seen from the inner side, in connection with a portion of the connecting-bars. Fig. 3 shows the same as seen from the outer or nearly rear side. Fig. 4 shows, on an enlarged scale, a part of the section taken on line A B of Fig. 3. Fig. 5 shows a horizontal section taken through the mounting-block employed in the attachment. Fig. 6 shows an end or edge view of the mounting-block in connection with the mechanism contiguous thereto. Fig. 7 shows the same as that shown in Fig. 6 from a different point of view.

Referring to the reference letters and figures in a more particular description, A A indicate the gang-frames of the wheel-cultivator shown, which gang-frames are capable of being elevated or depressed and are also capable of adjustment toward and from the central line of the machine, as is common in this class of wheel-cultivators. To the rear portion of the gang-frame there is attached rigidly an eye-piece 5, having a vertical opening or eye and a set-screw. Supported from the gang-frame by means of the inverted-U-shaped hanger 6 is the attachment-head 7. The attachment-head 7 is provided with an eye or opening and a set-screw, and the branches of the U-shaped hanger are inserted one in this eye and the other in the opening in the piece 5 and when adjusted to the proper position secured by the said set-screws. The attachment-head 7 is provided with an upwardly-extending attachment arm or post 8. The hiller shovel or blade 9 is mounted on a shank 10, which extends upwardly at the side of the attachment-head 7, and is attached thereto by a clamp and ratchet 11. The clamp and ratchet are held by the U-shaped clip 12, and when loosened the shank 10 can be adjusted vertically and angularly with reference to the attachment-head 7. When the nuts on the clip 12 are tightened, the blade is rigidly secured to the head 7. The hilling shovels or blades 9 are of an irregular form—that is to say, having a wing portion $9^a$, which acts substantially as a molding-board to throw over the earth. On the posts 8 of the attachment-head are mounted vertically-adjustable sleeves 13, having set-screws, by means of which they can be secured in adjusted position.

Extending from the hiller attachment to the hiller attachment on the other side of the machine are the connecting-bars 14 and 15. These bars at their ends are provided with a series of holes by means of which, in connection with the gang-adjusting mechanism on the frame, the distance apart of the shovel attachments can be regulated. The connecting-bars 14 and 15 are pivotally connected at each end to the sleeves 13, and the arrangement at this point is preferably as shown in detail in Fig. 4—that is to say, an ear $13^a$ on the sleeve is provided with a somewhat-enlarged opening, which receives the rounded portion of the pivot-piece 16. The piece 16 is provided with an opening, and the end of the bar, the piece 16, and the ear $13^a$ are pivotally secured together by the bolt 17 passing through the three and provided with suitable retaining-washers at either side.

It will be observed that by means of the construction shown and the several joints and attachments provided for that the hiller-blades can be placed at any desired angle with reference to the line of movement of the machine and at any desired angle with reference to the surface of the ground, and that the relation of the hiller attachment with reference to the gang and the working points of the gang-teeth can be nicely and carefully adjusted. When the attachment is used for cultivating a crop the plants of which have attained a considerable height, the sleeves 13 can be adjusted more or less toward the top of the attachment-posts, and thus enable the connecting-bars 14 and 15 to pass over the top. In case the plants of the crop are not large the sleeves 13 will preferably be adjusted toward the foot of the attachment-posts, and thereby provide a more direct connection between the hiller-blades. The two parallel connecting-bars 14 and 15 serve to prevent any tendency of the hiller-blades to separate when at work, while still allowing a comparatively free vertical or floating movement.

What I claim as new, and desire to secure by Letters Patent, is—

1. A hiller attachment for cultivators consisting of a pair of hiller-blades, a shank on which said blades are severally mounted, an attachment-head to which the blade-shanks are adjustably secured, hangers by means of which the attachment-head is secured to the rear end of the cultivator-gangs consisting of a U-shaped piece adjustably secured in openings in the attachment-head and on the rear end of the gang-frame and a cross connection between the attachments mounted on the respective gangs, substantially as set forth.

2. A hiller attachment for wheel-cultivators consisting of a pair of hiller-blades, attachment-heads on which the blades are adjustably mounted, U-shaped hangers having their branches adjustably secured in vertical openings in the attachment-heads and on the rear portion of the cultivator-gangs, respectively, and a cross connection between the hiller attachments on either side of the machine consisting of a pair of parallel bars pivotally attached to each device, substantially as set forth.

3. A hiller attachment for wheel-cultivators consisting of a pair of hiller-blades, attachment-heads on which said blades are adjustably mounted, hangers by means of which said heads may be attached to the rear portion of the cultivator-gangs, respectively, posts projecting upwardly from the attachment-heads, respectively, a cross connection between the said posts consisting of a pair of parallel bars pivotally attached at each end and means for adjusting said parallel bars vertically on said posts, substantially as set forth.

In witness whereof I have affixed my signature, in presence of two witnesses, this 25th day of May, 1903.

HIRAM M. BURDICK.

Witnesses:
E. WILLARD JONES,
S. A. BROWN.